United States Patent
Saarisalo (10) Patent No.: US 9,762,715 B2
(45) Date of Patent: Sep. 12, 2017

(54) SYSTEM AND METHOD FOR MANAGE AND CONTROL NEAR FIELD COMMUNICATION FOR A MOBILE MULTIFUNCTIONAL DEVICE WHEN THE DEVICE IS UNCHARGED OR ONLY PARTIALLY CHARGED

(75) Inventor: Mikko Saarisalo, Kantvik (FI)

(73) Assignee: Nokia Technologies Oy, Espoo (FI)

( * ) Notice: Subject to any disclaimer, the term of this patent is extended or adjusted under 35 U.S.C. 154(b) by 1580 days.

(21) Appl. No.: 12/226,718

(22) PCT Filed: Apr. 24, 2006

(86) PCT No.: PCT/IB2006/000980
§ 371 (c)(1),
(2), (4) Date: Oct. 24, 2008

(87) PCT Pub. No.: WO2007/122439
PCT Pub. Date: Nov. 1, 2007

(65) Prior Publication Data
US 2009/0291634 A1    Nov. 26, 2009

(51) Int. Cl.
*H04B 5/00*     (2006.01)
*H04M 1/725*    (2006.01)
(Continued)

(52) U.S. Cl.
CPC ...... *H04M 1/72527* (2013.01); *G06F 1/3212* (2013.01); *G06F 1/3287* (2013.01);
(Continued)

(58) Field of Classification Search
USPC ...................................................... 455/41.1
See application file for complete search history.

(56) References Cited

U.S. PATENT DOCUMENTS 6,265,974 B1   7/2001 D'Angelo et al.
7,502,635 B1   3/2009 Horikoshi et al.
(Continued)

FOREIGN PATENT DOCUMENTS

JP    200151756     2/2001
JP    2002325051    11/2002
(Continued)

OTHER PUBLICATIONS

Extended European Search Report for European Patent Application No. 06727528.9—Dated Apr. 12, 2016, 11 pages.
(Continued)

*Primary Examiner* — Hsin-Chun Liao
(74) *Attorney, Agent, or Firm* — Locke Lord LLP (57) ABSTRACT

The invention refers to a mobile electronic multifunctional device providing at least an interface for at least one first functionality and an interface to a near field communication (NFC) functionality, said device comprising a component providing an interface to said first functionality, and an interface to an NFC-communication component providing said NFC-communication functionality, a battery interface, a battery control circuit, connected to said battery interface, wherein said battery control circuit is provided to control the operation of said mobile electronic multifunctional device in accordance with a battery charging condition of a battery connected to said battery interface, wherein said battery control circuit provides a number of operating conditions for said mobile electronic multifunctional device in accordance with the charging condition of a battery connected to said battery interface, said charging condition including two or more operating conditions from the selection of normal operation conditions, a software cut-off condition, a hardware cut-off condition, and a battery cut-off condition. Said device comprises a storage to store configurations of an
(Continued)

NFC-communication component connected via said interface to a NFC-communication component for at least two of said operation conditions.

24 Claims, 5 Drawing Sheets (51) Int. Cl.
*G06F 1/32* (2006.01)
*H04W 52/02* (2009.01)

(52) U.S. Cl.
CPC ..... *H04W 52/0277* (2013.01); *Y02B 60/1282* (2013.01); *Y02B 60/1292* (2013.01); *Y02B 60/50* (2013.01)

(56) References Cited

U.S. PATENT DOCUMENTS

| | | |
|---|---|---|
| 2003/0135769 A1* | 7/2003 | Loughran .................... 713/310 |
| 2004/0176032 A1 | 9/2004 | Kotola et al. |
| 2005/0077356 A1 | 4/2005 | Takayama et al. |
| 2005/0120256 A1 | 6/2005 | Lu |
| 2005/0182976 A1* | 8/2005 | Berkes et al. ................ 713/300 |
| 2005/0253560 A1 | 11/2005 | Popescu-Stanesti et al. |
| 2006/0052055 A1 | 3/2006 | Rowse et al. |
| 2006/0079296 A1 | 4/2006 | Scheiblhofer |
| 2007/0094519 A1 | 4/2007 | Yamamoto |
| 2007/0239981 A1* | 10/2007 | Lessing ........................ 713/164 |

FOREIGN PATENT DOCUMENTS

| | | |
|---|---|---|
| JP | 2003514296 | 4/2003 |
| JP | 2005117116 | 4/2005 |
| JP | 2005303513 | 10/2005 |
| JP | 2006003932 | 1/2006 |
| JP | 2006013603 | 1/2006 |
| WO | WO00/41333 | 7/2000 |
| WO | WO0135200 | 5/2001 |
| WO | WO2005/008575 | 1/2005 |
| WO | WO 2005/038696 | 4/2005 |
| WO | WO2005038638 | 4/2005 |
| WO | WO 2006/010943 | 2/2006 |

OTHER PUBLICATIONS

EP Communication dated Mar. 2, 2017 for European Patent Application No. 06727528.9, 7 pages.

* cited by examiner

|  | Phone off | Phone on |
|---|---|---|
| NFCIP-1 | disabled | enabled |
| Mifare Classic emulation | enabled | enabled |
| Other Card Emulation | disabled | enabled |
| ISO smartcard, AID 1 | disabled | enabled/password? |
| ISO smartcard, AID 2 | enabled | enabled |
| ISO smartcard, rest | disabled | enabled |

Fig. 8

| | normal operation condition | software cut-off condition | hardware cut-off condition | battery cut-off condition |
|---|---|---|---|---|
| NFCIP-1 | enabled | disabled | disabled | disabled |
| Mifare Classic emulation | enabled | enabled | enabled | disabled |
| Other Card Emulation | enabled | disabled | disabled | disabled |
| ISO smartcard, AID 1 | enabled/password? | enabled | disabled | disabled |
| ISO smartcard, AID 2 | enabled | enabled | enabled | enabled |
| ISO smartcard, rest | enabled | disabled | disabled | disabled |

SYSTEM AND METHOD FOR MANAGE AND CONTROL NEAR FIELD COMMUNICATION FOR A MOBILE MULTIFUNCTIONAL DEVICE WHEN THE DEVICE IS UNCHARGED OR ONLY PARTIALLY CHARGED

The present invention relates to the field of mobile electronic multifunctional devices and methods for its operation. Especially the present invention pertains to mobile electronic multifunctional devices capable of performing wireless data communication. The present invention relates in particular to the field of near field communication enabled mobile electronic devices and methods for their operation. More particularly the present invention pertains to methods to manage and control near field communication in situations where the terminal is not or only partially powered.

Generally, the present invention is related to battery powered portable or mobile devices addressing the field of short-range communication technology, such as those near field communications technologies involving electromagnetic/electrostatic-coupling technologies and optical short-range communication technologies, namely especially near field communication technologies (NFC). In one possible embodiment of the RFID communication, electromagnetic and/or electrostatic coupling is implemented in the radio frequency (RF) portion of the electromagnetic spectrum, using for example radio frequency identification (RFID) technology, which primarily includes radio frequency identification (RFID) transponders, designated radio frequency (RFID) tags for simplicity, and radio frequency identification transponder readers, designated radio frequency (RFID) readers for simplicity.

The multi-functionality of the device of the present invention results from the combination of the functions of a mobile device in combination with an NFC/RFID functionality. That is, the general technological background resides in mobile electronic devices, and near field communication technology.

Plastic contact-less cards (RFID cards), mobile phones without NFC readers, mobile phones with NFC readers and mobile phones with NFC reader and a hardware implemented card emulation that is powered by phone battery are already known.

Terminals or mobile battery powered devices having e.g. terminal-integrated RFID communication logics with RFID tag emulation functionality are already known. For example document WO 2005045744 discloses an RFID APPARATUS comprising transmission means for receiving demodulating and transmitting an RF signals. The RFID apparatus disclosed in that document has means to respond to an RF reader device, in tag emulation mode, and means to function as an RF reader device, in reader mode.

In Document WO 2006010943 a MULTI-TAG EMULATOR is disclosed. In that document a device capable of emulating a plurality of RF data storage devices in a single device is disclosed.

Another document U.S. Pat. No. 6,776,339 pertains to a wireless communication device having a contact less interface for a smart card reader.

Another document referring to the technical field of the present invention is the international patent application with the number WO 2005008575. In this document an apparatus capable of operating in transponder mode is disclosed, wherein the transponder mode does not require power.

Especially in case of multifunctional devices such as NFC/RFID (emulation) enabled music players, mobile telephones, PDAs, palmtops, communicators, TV-devices and the like portable battery operated devices, it may occur that while a user operates the device the battery of the device may be discharged so that a operation of the device and consequently of the NFC/RFID (emulation) functionality is not longer provided, or at least the control of the NFC/RFID (emulation) functionality is lost.

So it may happen that a user of NFC/RFID (emulation) functionality for providing e.g. a subway ticket may loose the capability for providing his ticket to an inspection machine or person with the loss of the battery and consequently the loss of NFC/RFID (emulation) functionality. That is, a user of a weak/empty battery device may loose his authorization to e.g. enter or use a public transport device when the battery of the device used to emulate the NFC/RFID (emulation) functionality gets weak or discharged. That is, a user may not only be able to enjoy the primary function of the device but also not longer able to enjoy/use the functionality provided by the NFC/RFID (emulation) functionality of the device. This is an important problem that needs to be solved in order to get user acceptance in integrating contact-less payment and/or travel cards into mobile battery powered devices. The device may be capable of operating in card emulation/transponder mode without requiring power (such as e.g. by an RFID tag stuck onto the device). However, the user does not have a control over what information will be shown on the card emulation/transponder mode.

The above mentioned problem can occur also when e.g. the battery has been removed from the multifunctional device while a user may access the NFC/RFID functionality of e.g. a mobile telephone. It is desirable to have a multifunctional device that enables a user to use NFC/RFID functionality even in case of low/empty charging condition of said battery. (The conventional approach of providing a dedicated battery or a dedicated charge source for the components in question or the combination of NFC/RFID functionality based on completely passive RFID technology is however considered to be not providing satisfying results.)

It would also be desirable to have the possibility to use NFC/RFID functionality of a mobile electronic multifunctional device even in situations where no battery is connected to the device.

According to a first aspect of the present invention a mobile electronic multifunctional device is provided. The mobile electronic multifunctional device provides at least an interface to a (component providing) a battery powered first functionality and an interface to a near field communication (NFC) functionality. The mobile electronic multifunctional device comprises an interface for battery, a battery control circuit; a component providing an interface to said (component providing) at least one first functionality, an interface to an NFC-communication component and a storage.

The mobile electronic multifunctional device is mobile and intended to be battery powered, and is therefore provided with an interface to connect a battery to said mobile electronic multifunctional device. The mobile electronic multifunctional device is provided with a battery control circuit connected to said battery interface (and maybe to the rest of said device). The battery control circuit is provided to control the operation of said mobile electronic multifunctional device in accordance with a battery charging condition of a battery connected to said mobile electronic multifunctional device and to control also the utilization of the residual energy available on a battery connected to said battery interface.

The component to provide said interface to said (a component providing said at least one) first functionality, is provided to enable the device to implement the device with a first operability, for example a portable TV-set, a DVD, HD-DVD, Blue-Ray, MPX-player, a radio, a music (e.g. MP3) player, portable gaming console, a versatile device functionality such as e.g. PDA, a palm-top, a communicator, a (GPS- or Galileo-) navigator, a surveillance device or e.g. a mobile or cellular telephone functionality. The component providing said first functionality may comprise a user interface, to enable the user to actively interact with the mobile electronic multifunctional device to use said first functionality.

The interface to the NFC-communication component may be used to provide an NFC-communication functionality to the multifunctional device. With the interface to a device providing an NFC-communication functionality and the interface to (a component providing) said at least one first functionality the electronic device becomes a (potentially) multifunctional device. It could be noted that the NFC-communication component is also connected to the battery interface of the mobile electronic multifunctional device. It may also be noted that it is intended to connect an NFC-communication component with a user interface component to take provisions to use said (at least one) first functionality to grant e.g. access via said interface to a NFC-communication component to said NFC-communication component via said user interface of said component to provide said (at least one) first functionality.

The battery control circuit provides two or more operation conditions for said mobile electronic multifunctional device in accordance with the charging condition of a battery connected to said battery interface from the selection of
  a normal operation condition, for charged battery,
  a software cut-off condition, for lower charging state of the battery,
  a hardware cut-off condition, for discharged battery, and
  a battery cut-off condition, for uncharged, undercharged or e.g. removed battery
to prevent deep discharge of a battery connected to said battery interface, as deep discharge might damage a battery connected to said battery interface or at least reduce the capacity of a battery connected to said battery interface.

Said software cut-off condition, said hardware cut-off condition, and said battery cut-off condition may be summarized under the main category battery empty condition (of a connected battery), while the normal operation condition may be denoted as battery full condition. It should be noted here that the software cut-off condition and the hardware cut-off condition, may be implemented as the same operation condition. It may also be noted that in the battery cut-off condition even the battery control circuit is disconnected from the battery (or the battery is removed). It is noted that the hardware cut-off condition also includes the software cut-off condition, and that the battery cut-off includes both hardware and software cut-off conditions.

The device according to embodiments of the invention further comprises a storage to store configurations of an NFC-communication component connected via said interface to said NFC-component for (at least two different ones of) said operation conditions of a connected NFC-component.

That is, the device according to the present invention allows at least in one of the above mentioned software cut-off-, hardware cut-off- or battery cut-off condition an operation of an NFC-communication component (connected via said interface to said NFC-component) in addition to the operation of said NFC-communication component (connected via said interface to said NFC-component) under normal operation condition.

By said storage (to store configurations of said NFC-communication component connected via said interface to said NFC-component for at least two of said operation conditions), the mobile multifunctional device may be configured to allow (possibly) different configurations of said NFC-communication component for "normal operation" and one of said "battery empty conditions" (of a battery connected or disconnected to said battery interface). The mobile electronic multifunctional device allows an (expectedly restricted) "emergency" use of an NFC-communication component (connected via said interface to said NFC-component) in at least one of said battery empty conditions (including the battery disconnected condition).

Said storage may be pre-programmed to allow e.g. one or two selected NFC-communication functionalities to be performed in one of said battery empty conditions (of a connected battery) when e.g. an NFC-communication event is detected by the NFC-communication component (connected via said interface to said NFC-component) in one of said battery empty conditions (of a connected battery), and may allow all NFC functionalities in the normal operation condition.

In a basic implementation the storage may be programmed to use different battery voltage thresholds for software/hardware cut-off for cutting off the first functionality at higher battery voltages (of a connected battery) on one hand and cutting off said NFC-communication functionality (of an NFC component connected via said interface to said NFC-component) at lower battery voltages (of a connected battery) on the other hand. It is to be noted that in this context the operation conditions are differentiated.

In this basic embodiment of the present invention the present invention may also be embodied as a chipset for a mobile multifunctional device.

In an example embodiment of the present invention said mobile electronic multifunctional device further comprises a component providing said at least one functionality, connected to said interface to said at least one functionality. In another example embodiment of the present invention said mobile electronic multifunctional device further comprises a battery, connected to said battery interface. In yet another example embodiment of the present invention said mobile electronic multifunctional device further comprises an NFC-communication component, connected to said interface to a NFC-communication component.

In this embodiment the device is already provided with the battery powered (at least one) first functionality. In this embodiment the interface may be embodied as a connection of e.g. as an application protocol interface for said first functionality. It may be noted that the interface is not necessarily disconnectable. That is the interface may be embodied as a hard wired connection, logical links (in a software implementation) or even as printed circuits on a printed circuit board (or the respective implementation in an integrated circuit chip).

The component said (at least one) first functionality (via said interface to said first functionality), is provided to enable the device to implement the device with a first operability, for example a portable TV-set, a DVD, HD-DVD, Blue-Ray, MPX-player, a radio, a music (e.g. MP3) player, portable gaming console, a versatile device functionality such as e.g. PDA, a palm-top, a communicator, a (GPS- or Galileo-) navigator, a surveillance device or e.g. a mobile or cellular telephone functionality. The component providing said first functionality may comprise a user interface, to enable the user to actively interact with the mobile electronic multifunctional device to use said first functionality.

The mobile electronic multifunctional device comprises also a battery connected to said battery interface. The battery may be embodied as an interchangeable battery (module) like it is known from conventional cellular telephones. The, battery may be embodied as an interchangeable primer batteries like it is known from conventional small electronic devices. The, a battery may be embodied as a built in battery like it is known from some portable MP3 player devices. As in the case of the interface to the first functionality it should be noted that the interface to the battery is not necessarily disconnectable. That is, the interface may be embodied as a hard wired connection or as printed circuits on a printed circuit board.

The battery control circuit is provided to control the operation of said mobile electronic multifunctional device in accordance with a battery charging condition of a battery connected to said mobile electronic multifunctional device and to control also the utilization of the residual energy available on a battery connected to said battery interface.

In yet another example embodiment of the present invention said mobile electronic multifunctional device further comprises an NFC-communication component, connected to said interface to a NFC-communication component. It may be noted again that the interface is not necessarily disconnectable. That is, the interface may be embodied as a hard wired connection, logical links (in a software implementation) or even as printed circuits on a printed circuit board (or the respective implementation in an integrated circuit chip).

In another example embodiment of the present invention said NFC-communication component is provided with a dedicated memory, that stores information on how operate said NFC-component or said mobile electronic multifunctional device under at least two of said normal operation, software cut-off, hardware cut-off and/or said battery cut-off conditions upon detecting a NFC-wakeup event.

This embodiment pertains to a device in which said storage is used as a dedicated component to be able to ensure that the NFC-communication component can access this dedicated storage event under software/hardware cut-off conditions of the said first functionality. The dedicated memory has the additional advantage that it may be tailored to be low voltage operable, so that the power consumption of the NFC-communication component can be prolonged with respect to the operation of e.g. a single memory device used by the NFC-communication component and the component providing said at least one first functionality. This implementation can suggest the use of low voltage operable components (memories) in at least the NFC-communication component. The use of low voltage operable components is already known in the field especially of battery-less RF-powered NFC-transponders.

In yet another example embodiment said dedicated memory is operable in a partially powered state. This embodiment is directed to enable especially a low power operation of said NFC-communication component, as not the whole memory has to be powered e.g. just by a received radio frequency field (e.g. from a NFC-reader device nearby).

In still another example embodiment said mobile electronic multifunctional device is provided with a user interface, wherein said memory is configurable by a user input via said interface. It may be noted that the user interface may be primarily provided for the first functionality of said mobile multifunctional device. It is also envisaged to implement different user interface elements for the first functionality and said NFC-communication component or functionality.

In yet another example embodiment said mobile electronic multifunctional device is provided with a storage to store configurations of said battery control circuit for at least two of said operation conditions. In this embodiment of the present invention operation of the battery control circuit relies on a storage so that the battery control circuit utilizes/controls/directs the energy of the battery to the NFC-components or modules based on the current operation condition. Due to the fact that the battery control relies in an storage and not on a hard wired control logic the device may be provided with different powered state to not powered state transition paths.

In still another example embodiment said mobile electronic multifunctional device is provided with a user interface, and said battery control circuit is configurable by a user input via said interface. That is, in this embodiment the user is capable of defining also the actual operation of the device/battery control circuit (NFC front-end visible/not visible) in addition to the selection what will be visible. In this embodiment of the present invention the user may also select the different software and (partial) hardware cut-off procedures and states. With this embodiment the user may select how the device may behave if and when the battery power fades. With this embodiment the user may also select under which conditions the battery control circuit may power the NFC-components, or e.g. only said memory so support a NFC transponder functionality of the NFC-components of said device. The user interface provides means for the user to select the terminal behavior in power off-mode when the terminal is still powered, i.e. beforehand.

In just another example embodiment of the present invention said first functionality further comprises cellular telephone functionality. That is, the mobile multifunctional device may be implemented as an NFC-enabled mobile telephone. With the present invention it becomes possible to use e.g. the NFC component of the NFC-communication enabled mobile telephone even if the battery power of the battery is not sufficient to operate e.g. the GSM radio stage of the mobile telephone. Especially in case that the mobile (or cellular) telephone is used as a access ticket for e.g. underground transportation facilities it becomes necessary to be able to access the transportation facility even if the battery of the mobile telephone gets discharged by trying to connect to a (not present) base station in the underground.

In yet another example embodiment of the present invention said first functionality comprises data reproduction functionality such as an MP2 and MP3 decoder/player, a portable TV and the like. It is also envisaged to combine e.g. an MP3 player with a communication device such as mobile telephone and a device with an NFC-capability to a multifunctional device.

According to just another additional example embodiment of the present invention, said battery is detachable from said mobile electronic multifunctional device.

According to just another additional aspect of the present invention a mobile electronic device providing at least one interface to (a component providing) at least one functionality is provided. Said device comprises a component providing said interface to said (component providing) at least one functionality, a battery interface, and a battery control circuit. The battery control circuit is connected to said battery interface. Said battery control circuit is provided to control the operation of said mobile electronic multifunctional device in accordance with a battery charging condition of a battery connected to said battery interface. Said battery control circuit provides a number of operation conditions for said mobile electronic multifunctional device in accordance with the charging condition of a battery connected to said battery interface, said charging condition includes two or more operation conditions from at least the selection of: normal operation conditions, a software cut-off condition, a hardware cut-off condition, and a battery cut-off condition. Said device comprises a user-configurable storage to store configurations of said mobile electronic device for at least two of said operation conditions.

Basically said at interface for said (component providing) least one functionality may is arbitrarily selected. The interface may for example provide a connection to a portable TV-set, a DVD, HD-DVD, Blue-Ray, MPX-player, a radio, a music (e.g. MP3) player, portable gaming console, a versatile device functionality such as e.g. PDA, a palm-top, a communicator, a (GPS- or Galileo-) navigator, a surveillance device or defense device, a flashlight a, digital camera, or e.g. a mobile or cellular telephone functionality. The different configurations of said mobile electronic device for at least two of said operation conditions may for example comprise the restriction of the execution of certain programs or the provision of power to different components of the mobile electronic device. Basically, this embodiment may be construed as a device with the capability of defining additional operation conditions such as "play audio but video cutoff condition", "operate electronic paper display bur disable touch screen" . . . without limitation. It may also be envisaged to define the different voltages (or charging conditions) for each of said present or newly definable operation conditions.

In an example embodiment of the present invention said mobile electronic device according to claim, further comprises a component providing said at least one functionality, connected to said interface to said at least one functionality. The at least one functionality may be implemented for example a portable TV-set, a DVD, HD-DVD, Blue-Ray, MPX-player, a radio, a music (e.g. MP3) player, portable gaming console, a versatile device functionality such as e.g. PDA, a palm-top, a communicator, a (GPS- or Galileo-) navigator, a surveillance device or defense device, a digital camera or e.g. a flashlight or e.g. a mobile or cellular telephone functionality. As already described in the preceding specification the functionality may be connected via a disconnectable interface or via a hard wired interface.

In another example embodiment of the present invention said mobile electronic device according to claim, further comprises a battery, connected to said battery interface.

In an example embodiment of the present invention said mobile electronic device comprises a user interface, wherein said battery control circuit is configurable by a user input via said interface. That is in contrast to all known state of the art embodiments of battery control circuits a user may freely select personalized settings for each operation condition (or battery charging status) of said mobile electronic device. It should be noted that this storage may be embodied as a non-volatile storage to keep the settings even under battery cut-off conditions (or even when the battery has been removed).

In just another example embodiment of the present invention said at least one functionality comprises at least one functionality selected from the group of cellular telephone functionality, an NFC functionality or a data reproduction functionality. It is also envisaged to implement a camera (for still pictures and or videos) or a data storage capability (such as a USB storage stick) or a mobile telephone (for one of the present or future standards GSM, UMTS, i-mode or the like) or a navigation system (including for example a Galileo- or a GPS receiver) in the device.

According to another aspect of the present invention an interface for a mobile electronic device as described in the preceding specification is provided. The interface enables a user of a mobile electronic device to configure said mobile electronic multifunctional device to select how to operate said mobile electronic device in at least two of said normal operation, software cut-off, hardware cut-off and/or said battery cut-off conditions.

In an example embodiment of the present invention said mobile electronic device is a mobile electronic multifunctional device having a NFC-communication component as disclosed as described in the preceding specification. In this example embodiment the interface enables a user of a mobile electronic multifunctional device to configure said mobile electronic multifunctional device to select how to operate said NFC-communication component under at least two of said normal operation, software cut-off, hardware cut-off and/or said battery cut-off condition.

In an example embodiment of the present invention said interface enables a user of said mobile electronic multifunctional device to select different configurations of said NFC-communication component in at least two of the following operation conditions: in a normal operation condition, a software cut-off condition, a hardware cut-off condition, and/or in a battery cut-off condition.

That is, the user interface is provided on said mobile electronic multifunctional device to configure the device to react in said different battery/cut-off condition in a different manner to detected NFC-communication events. It may be noted that the device of the present invention has to be able to operate the NFC-communication component even in one of the cited software cut-off, hardware cut-off or battery cut-off condition of the mobile multifunctional device as otherwise it would not be very sensible to define respective configurations (besides off) for the NFC-communication component.

In yet another example embodiment of the present invention said interface allows the user to define the operation of said terminal for the power-off condition. That is the interface allows the user to define parameters for the operation of the terminal when the device enters one of the powered-off states such as switched-off operation condition, which may occur e.g. in normal operation condition a software cut-off condition, a hardware cut-off condition, and/or a battery cut-off condition (including e.g. a removed battery). It should be clear that this interface may only be accessed by a user in a powered operation condition, i.e. of the beforehand, before entering one of the low-charged or low battery or device-off operation conditions.

According to another aspect of the present invention a method for operating a mobile electronic multifunctional device as disclosed in the preceding description is provided. The method comprises detecting an NFC-communication event, determining the current operation condition of the mobile electronic multifunctional device, determining a configuration of said NFC-communication component related to said detected operation condition, and operating a NFC-component of said mobile electronic multifunctional device in accordance with said determined configuration of said NFC-communication component.

The method may comprise detecting an NFC-communication event, determining the current operation condition as normal operation condition, software cut-off condition, hardware cut-off condition or battery cut-off condition. The determining of the configuration of said NFC-communication component related to said detected operation condition, (i.e. for at least two of said normal operation condition, software cut-off condition, hardware cut-off or battery cut-off condition) and operating a NFC-component of said mobile electronic multifunctional device in accordance with said determined configuration of said NFC-communication component.

That is, according to embodiments of the present invention a mobile multifunctional device receives/detects an NFC-communication event and reacts/answers this detected communication event in accordance with (data related to) the current operation condition of said device.

It should be noted that the step of operating a NFC-component of said mobile electronic multifunctional device in accordance with said determined configuration of said NFC-communication component may further comprise powering said NFC-component by the battery control circuit even under said hardware cut-off condition. If the device is under battery cut-off, the only energy that is available to operate the NFC-components will be coming from external (RF-) sources.

It should also be noted that said determination of said current operation state may be performed before the detection of said NFC-communication event. That is, the NFC-component may be aware that it is in a powered down state, and therefore knows that it/the mobile electronic multifunctional device is currently in a software cut-off or hardware cut-off state when detecting the NFC-communication event, and therefore may also determine in advance how to answer a receive or how to configure the NFC-communication component of a multifunctional device.

In an example embodiment of the present invention said operation condition of said mobile multifunctional device comprises a normal operation condition, and at least one of the following operation conditions selected from a software cut-off condition, a hardware cut-off condition, and a battery cut-off condition. This embodiment the different operation conditions are defined for different battery charge conditions. It may be noted that the battery cut-off condition is considered as an operation condition even if severe restriction in operation have to be expected.

According to one embodiment of the present invention the device may only have two different operation conditions for which configurations for the NFC-communication component are defined, e.g. the normal operation condition and the software cut-off condition. In a more sophisticated embodiment a user may have the options to select different NFC-communication configuration for each of the cited operation conditions (even if this implementation has the drawback that a user may not intuitively determine in which of the different battery low conditions the device currently is).

In just another example embodiment the method further comprises using the received RF energy from said NFC-communication event, to power said NFC-communication component of a mobile electronic multifunctional device. This implementation is especially useful for NFC components capable of acting as an NFC-transponder in case of hardware- and battery cut-off conditions.

In a simple implementation of this embodiment the RF powered NFC-communication component may send a signal to the battery control circuit to request e.g. short period power supply by from the battery. With the power from the residual battery the NFC-component may handle/answer the NFC-communication request.

An example embodiment of the method of the present invention further comprises using a part of said received RF energy of said NFC-communication event, to (at least partially) read out (or power) a memory device, in which information is stored related to the configuration of said NFC-communication component related to said detected operation condition of the device is stored, i.e. for at least two of said normal operation conditions, software cut-off condition, hardware cut-off condition, or battery cut-off condition.

It is also envisaged to use this implementation only for using the received power to request a restricted battery access for reading out the memory with the currently selected NFC-communication component configuration memory.

In still another example embodiment of the present invention the determination of said current operation condition determines that the operation condition of the mobile electronic multifunctional device is software cut-off or hardware cut-off condition. In this embodiment said method further comprises powering said NFC-component of said mobile electronic multifunctional device, after detecting said NFC communication event.

This may be implemented e.g. by notifying a battery management circuit/power management circuit of said mobile electronic multifunctional device to power said NFC-component for e.g. a predetermined period of time.

In yet another example embodiment of the present invention the method further comprises, receiving a user input defining the configurations of said NFC-communication component for said normal operation condition, software cut-off condition, hardware cut-off condition and battery cut-off, and storing said configurations of said NFC-communication component in a storage of said mobile electronic multifunctional device.

In still another example embodiment of the present invention the method further comprises, detecting a voltage of the battery of said mobile electronic multifunctional device by said battery control circuit, determining the current operation condition of said mobile electronic multifunctional device, determining a configuration of said mobile electronic multifunctional device related to said detected operation condition, and operating said mobile electronic multifunctional device in accordance with said determined configuration of said mobile electronic multifunctional device.

This embodiment enables a user or a manufacturer of the mobile multifunctional device to define the actual operation of the device/battery control circuit (in addition to the configuration of the NFC front-end as visible or not visible) in addition to the selection what will be visible. Due to the storage/memory the battery control circuit can access, the manufacturer has the possibility to select different configurations of the mobile multifunctional device for each of the operation conditions. That is, in this embodiment of the present invention a manufacturer/user may select and/or define the operation conditions e.g. by defining additional operation sates such as a "software cut-off condition one" wherein e.g. a mobile telephone enters an "offline mode" or only sporadically connects to a base station to request for short messages pending or the like. It is also envisaged to implement new (partial) hardware cutoff conditions, wherein e.g. only the backlight of a display is hardware cut-off to saver battery power to prolong the operation time of the mobile multifunctional device.

In this embodiment (at lest the manufacturer) has the freedom to select and/define the operation of the battery control circuit so that the battery control circuit utilizes/controls/directs the energy of the battery to the (software/hardware) components (e.g. to the NFC modules) based on the current operation condition.

In yet another example embodiment of the present invention the method further comprises, receiving a user input defining the configurations of said mobile electronic multifunctional device for at least one of said normal operation, software cut-off, hardware cut-off and/or battery cut-off conditions, and storing said configurations of said NFC-communication component in a storage of said mobile electronic multifunctional device.

In this embodiment of the present invention the user is capable of defining also the actual operation of the device/battery control circuit (e.g. of the NFC front-end visible/not visible) in addition to the selection what will be visible. That is the user has the possibility to configure the battery control circuit so that the battery control circuit utilizes/controls/directs the energy of the battery to the components of the mobile multifunctional device according to the current battery voltage/charging condition. The user may have the freedom to select a "hard cut-off" to enable full functionality of the mobile electronic multifunctional device or may have the freedom to select one (or a number) of applications that should be kept functional for a maximum time. The user may select if the device should be able to operate the NFC-component for a prolonged period of time, or if he wants to enable e.g. TV-operation only for at least more then 50% charged battery. This aspect is applicable to nearly any application or operational parameter of a mobile electronic multifunctional device.

According to another aspect of the present invention a method for operating a mobile electronic device as described in the preceding specification is provided. The method comprises the steps of receiving a user input defining the configurations of said mobile electronic device for at least two of said normal operation, software cut-off, hardware cut-off and/or battery cut-off conditions, and storing said configurations of said mobile electronic device in a storage of said mobile electronic multifunctional device. This first step of the present invention resides in defining by a user different operation conditions or configurations for (or in addition to) (at least one of) the known configurations. That is, a user may freely define different voltage thresholds at which the device may change from one of said configurations to another one. The user may freely define additional configurations such as a flashlight mode wherein only the display illumination is operable, (e.g. between software and hardware cut-off). However, this embodiment of the method of the present invention may only be considered as the introductory part of the invention.

In another example embodiment of the present invention the method further comprises detecting a charging condition of said battery, determining an operation condition of said mobile electronic multifunctional device related to said detected charging condition of said battery, and operating said mobile electronic device in accordance with said determined operation condition of said mobile electronic multifunctional device. In contrast to the state of the art the device is operated in accordance with a determined operation that previously been defined by a user. If for example the device is a DVB-H (cellular telephone TV) mobile phone, an the user wants to see a special TV-program he may select that the device interrupts all other applications (and cuts-off all additional components) if the expected time before interrupting the TV-operation (due to low battery) becomes less than e.g. 90 minutes (the expected time for a soccer game or an average TV film). That is, the sure may select all applications and components that may be cut-off for each charging condition of the battery and/or each operation condition. It may also possible to define different paths through said defined operation conditions for each one of successive power cut-offs. It may be possible to define e.g. in a mobile cellular telephone a battery cutoff for a first battery voltage (to ensure e.g. that the residual power in the battery is sufficient to make an emergency call even under non optimal conditions), and allowing second lower threshold for the second battery cutoff (to ensure that the phone call may user all battery power left). In this embodiment the counter may be reset e.g. by a charging process.

According to another aspect of the present invention, a computer program product is provided, which comprises program code sections stored on a machine-readable medium for carrying out the operations of the method according to any aforementioned embodiment of the invention, when the computer program product is run on a mobile multifunctional device or a mobile communication enabled terminal.

According to another aspect of the present invention, a computer program product is provided, comprising program code sections stored on a machine-readable medium for carrying out the operations of the aforementioned method according to an embodiment of the present invention, when the computer program product is run on a processor-based device, a computer, a terminal, a network device, a mobile terminal, or a mobile communication enabled terminal.

According to another aspect of the present invention, a software tool is provided. The software tool comprises program portions for carrying out the operations of the aforementioned methods when the software tool is implemented in a computer program and/or executed.

According to another aspect of the present invention, a computer data signal embodied in a carrier wave and representing instructions is provided which when executed by a processor causes the operations of the method according to an aforementioned embodiment of the invention to be carried out.

In the following, the invention will be described in detail by referring to the enclosed drawings in which.

In the detailed description which follows, identical components have been given the same reference numerals, regardless of whether they are shown in different embodiments of the present invention. In order to clearly and concisely illustrate the present invention, the drawings may not necessarily be to scale and certain features may be shown in somewhat schematic form.

Figure 1:
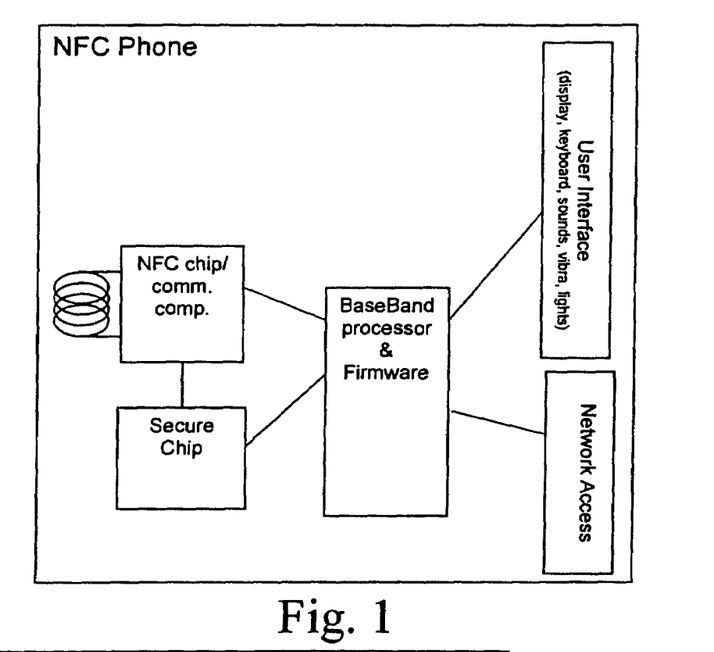
FIG. 1 is an example illustration of a mobile electronic multifunctional device according to the state of the art.

FIG. 1 is an example illustration of a mobile electronic multifunctional device according to the state of the art. The depicted embodiment is implemented as a near field communication enabled cellular telephone as a first functionality and a NFC communication component as a second functionality. The device is provided with a base-band processor and a firmware as running on a central processing unit. The central processing unit is connected at one side with a network interface for providing the radio network access for the mobile or cellular network part of the mobile electronic multifunctional device (MEMD). On the left side of the MEMD the NFC-communication functionality is implemented by the NFC-chip and the secure chip for NFC-communication. The MEMD is additionally provided with a user interface for providing user with means to control and use the MEMD. The interface may comprise displays, keys, keypads or keyboards, loudspeakers, vibration actuators/sensors, lights, infrared/electric/radio connectors and the like. With such a design the MEMD may be controlled under normal operation conditions (i.e. the device is switched on) as a mobile telephone and a NFC-communication device capable of emulating different NFC devices such as NC reader or NFC (e.g. an RFID) transponder. That is, such a device is capable of serving as NFC communication device and as a mobile telephone.

However, as can be seen on architecture of the device illustrated in FIG. 1, it is only possible to use both e.g. the NFC- and cellular components of the device if and when the device is switched on or is in a normal operation state. When the device is switched off or the connection to the power supply is interrupted, both functionalities are not longer available. That is in case the user has made a long phone call (e.g. in a train) until the battery of the device is empty, and the phone call has been interrupted, the user can also not longer use the NFC-communication component of the device. If the user has a NFC based access system and uses a NFC based public transport payment system, the user is not only able to use the phone, the user is not longer able to use e.g. the public transport or enter the house in case the battery of the NFC-enabled device is empty.

Figure 2:
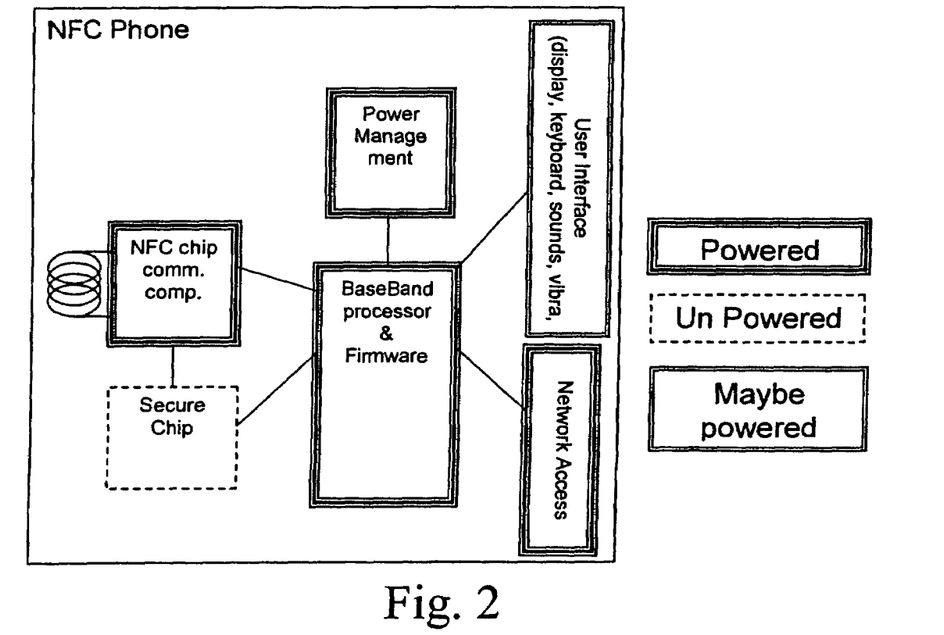
FIG. 2 is an example illustration of a mobile electronic multifunctional device according to an embodiment of the present invention in a normal operation condition in an NFC-Reader/Writer mode.

FIG. 2 is an example illustration of a mobile electronic multifunctional device according to one embodiment of the present invention in a normal operation condition in an NFC-Reader/Writer mode. The device is depicted in a normal operation condition. In addition to the device of FIG. 1 the device of the present invention is provided with a power management stage or battery control circuit. The battery control circuit or power management stage is connected to a battery (not depicted) and to the base-band/firmware processor. It is also envisaged to provide dedicated connections to the NFC components such as e.g. NFC chip itself and the secure chip. These additional connections may be provided to enable the battery control circuit (or power supply circuit) to selectively power each component (and especially the components necessary to perform NFC communication and/or NFC-tag emulation).

Especially from FIG. 2 can be seen how the single components of the MEMD may be provided with power in normal operation condition (switched-on device). In the MEMD only the secure NFC-chip is not powered. The user interfaces of the MEMD may be powered as known from screensaver conditions or key-lock conditions known from modern cellular telephones.

In the switched on condition all devices or components of the MEMD are operable. As the present invention relates to the operation of mobile terminals equipped with NFC/RFID and more particularly how to manage and control card emulation in situations where the terminal is not powered, there is not a lot of different features to be recognized in a powered condition of the device.

However, the present invention provides a memory connected to the NFC-communication component that in this embodiment is integrated in the base-band/firmware processor. To allow the use of NFC/RFID front-end in for secure smart card applications the MEMD is further provided with secure smart card module.

Figure 3:
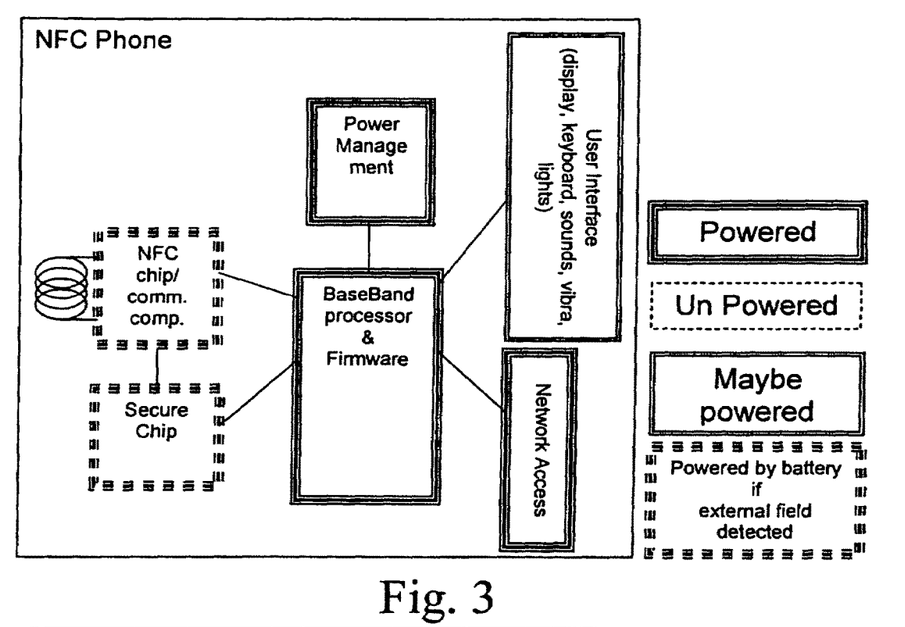
FIG. 3 depicts the mobile electronic multifunctional device of FIG. 2 in a normal operation condition in an NFC-Card Emulation Mode according to one embodiment of the present invention.

FIG. 3 depicts the mobile electronic multifunctional device of FIG. 2 in a normal operation condition in an NFC-Card Emulation Mode according to one embodiment of the present invention. In contrast to FIG. 2, the NFC components are only operated by the battery if and when an external radio frequency field is detected by the NFC component. The operation mode of the NFC component is NFC/RFID-tag emulation. To prevent unnecessary waste of power the NFC components are only powered when needed, that is when e.g. a radio frequency (RF-) signal is detected.

Figure 4:
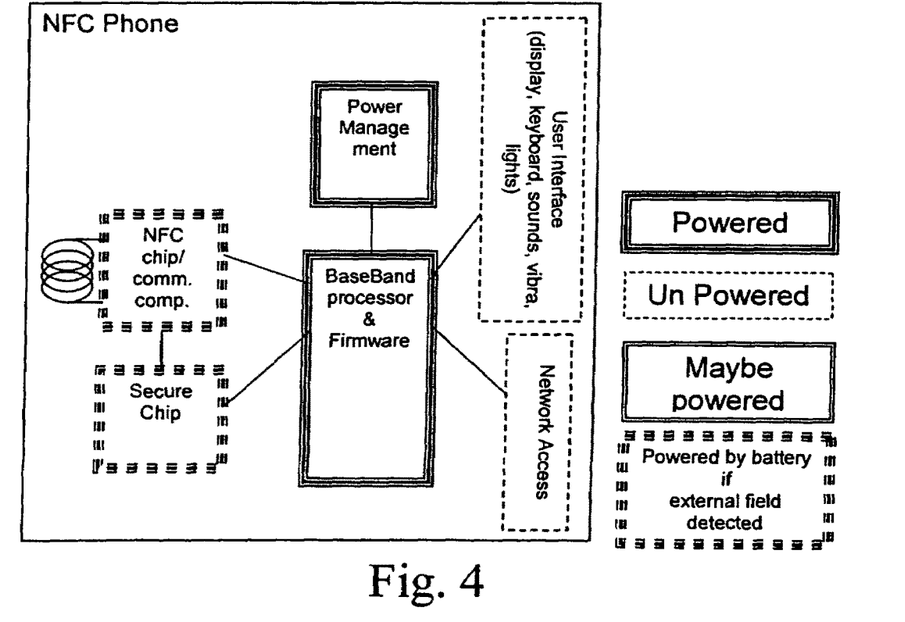
FIG. 4 depicts the mobile electronic multifunctional device of FIG. 2 in a battery low of device off condition in an NFC-Card Emulation Mode according to one embodiment of the present invention.

FIG. 4 depicts an illustration of the mobile electronic multifunctional device of FIGS. 2 and 3 in a battery low or device off condition in an NFC-Card emulation mode according to one embodiment of the present invention. In the battery low or power off (e.g. one of the hardware and software cut-off) conditions, the primary functionality (i.e. the component providing said first functionality) that is the telephone with its user interface and the network access component are not powered. However, the power management and the base-band and firmware processor are powered for providing means to control the operation of the NFC-components.

It is also envisaged to implement an embodiment wherein the power management and the base-band and firmware processor are also normally in a not powered state and may be powered by the battery if a signal from the NFC component is received indicating that the NFC component detected an RF signal. This external RF field detected means that the RF front-end detects an RF field and that it is capable of "tuning to", i.e. an RF field with matching frequency and other characteristics.

The present invention may be used in a switched-off state of the MEMD, in a software cut-off state or in a hardware cut-off state entered because the battery voltage or charging condition has fallen below a predetermined threshold.

FIG. 4 clearly indicates an implementation that may be used to utilize the (residual) power left in the battery in power off-situations when the NFC/RFID front-end detects an external field.

The depicted device selectively powers parts of a system in order to provide "power off", software cut-off ore hardware cut-off functionality for end user of the MEMD.

Even though it is usually not intended to implement mobile devices having a "surprising behavior" this invention may provide a user with an NFC-functionality in both cases under phone-on and battery discharged/phone off conditions. Anyhow the implementation is not capable of providing NFC-operability under battery cut-off (or battery completely discharged) conditions, as there is not enough energy left in the battery to power the NFC component (the battery control circuit or the base-band and firmware processor).

That is, the depicted implementation may provide under some of the cut-off conditions an NFC-functionality and in some of the battery cutoff conditions no NFC-functionality, which may lead to confused and frustrated users, as the device sometimes when it seems to be "switched off" may be able to operate the NFC-component, and sometimes not. Additionally a user may not longer be sure that all functions (especially the NFC-functions) are switched off when the user turns off the device.

The invention can enable a user to control the card emulation visibility in all operational states. The device may even have means to perform certain predefined operations upon receiving battery cut-off or hardware cut-off situations so that the user preferred/previously selected information is provided in the tag logic memory so that the device is capable of providing the preferred output to a device providing suitable interrogation field for energizing the tag logics of the device. She should have control to disable and enable card emulation all together. She also may have more fine grained control over card emulation like: for example disable for example the NFC card emulation "Mifare Classic" and enable the NFC emulation "ISO 14443-4". It may also be possible to enable "bus ticket" NFC application and to disable e.g. a "credit card"—NFC-application or functionality.

This invention enables a user to have the same (or different) settings in place also when the phone is off by providing a shared memory or firmware to drive the operation in both cases (on and off). In a simple case the (different or same) settings or configurations of the NFC component for the different operation states of the MEMD may be stored in a pre-coded memory device of the MEMD (not accessible by the user). In a more sophisticated embodiment of a MEMD the user may select by an interface such as depicted in one of FIG. 8 or 9 in which operation state/operation condition which configuration of the NFC component should be selected/enabled. To enable the user to select different settings of the NFC component, the MEMD is equipped with a user interface to select card emulation configurations to the phone (MEMD). The user interface is only available when the phone is on. For an illustrative example about the configurable options, see FIGS. 8 and 9. The terminal is capable of providing certain automated settings and the user is capable of controlling and changes based on his/her needs with the dedicated user interface.

The system depicted in FIG. 4 may e.g. rely on a residual power left in to the battery between SW cut-off and HW cut-off voltages or between SW cut-off and battery cut-off voltages. In Phone-off (or MEMD off) situation the battery level may be anywhere above hardware cut-off. Below software cut-off voltage, the operation is clearly "Battery empty" (or "MEMD off") operation. With respect to this invention, the switched-off condition on one hand and the software cut-off on the other hand make no other difference than in the battery-empty case the phone cannot be switched on by the user, which is irrelevant for the embodiment presented in FIG. 4.

When the phone is anywhere above HW cut-off voltage and switched off, basically only the user interface and any network side and RF components are switched off. The processor is able to wake up and execute phone software, when woken up by an "external field present" interrupt from NFC component. At this time the processor can also execute the card emulation related code and make decision of whether the card emulation is visible to a reader (not the user) or not. It is also able to execute any other card emulation related code like software implemented card emulation. The signal from the NFC component will not, however wake up the user interface or the cellular networking parts of the phone.

This approach provides in many cases the means needed to fulfill for instance public transportation requirements about users being able to exit a closed gate metro system even when the phone has run out of battery (for its main application/first functionality).

In the MEMD of FIG. 4 the NFC component is capable of waking up the base-band and firmware processor by an interrupt signal. The card emulation may reside anywhere from a separate component to an integrated component with NFC component to (more likely) integrated or embedded in the base-band and firmware stage/processor.

Figure 5:
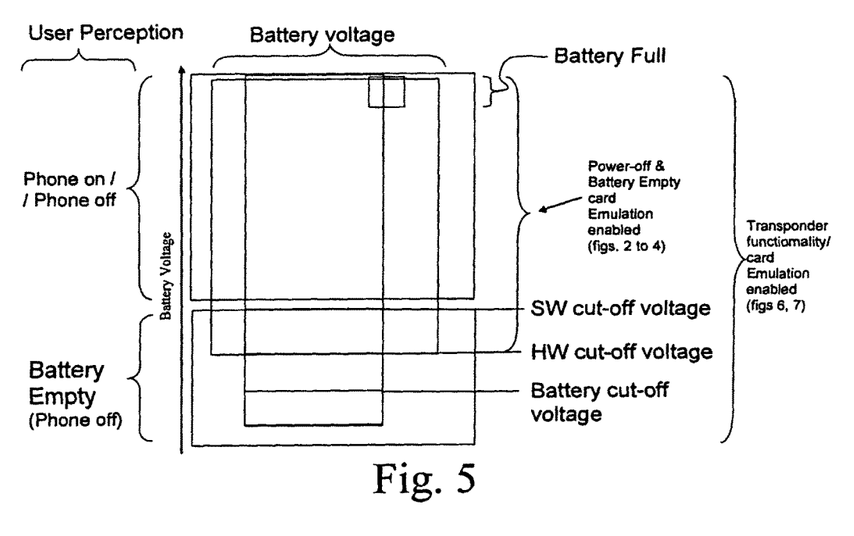
FIG. 5 depicts a the battery discharging phases with respect to the actual operation states of the mobile electronic multifunctional device.

FIG. 5 depicts the battery discharging phases with respect to the actual operation states of the mobile electronic multifunctional device with respect to the battery voltage. In FIG. 5 the diagram depicts the different operation conditions are depicted with respect to a user perception of the MEMD. A user may only percept "a switched on" or "a switched off" state (independent from the actual battery voltage) and a battery charged or a batter discharged condition of the MEMD. The main difference between the battery charged and the battery discharged condition resides in the fact that in the battery discharged state the device can not be witched on.

In the battery charged (especially in the battery fully charged) condition normal operation with all options (including switching off the device) is possible.

In the battery discharged or battery empty most conventionally no operation of the MEMD is possible at all.

Not perceivable by a user but usually implemented there are different stages of the powering down a MEMD that are usually implemented. In a first stage the device performs a software cut-off, when the voltage of the battery falls below a predefined threshold. This software cut-off usually is used to store data into persistent memories, cut-off or terminate different software application to prevent data loss, and may be accompanied by a short notification to the user that the end of battery power and battery operation is near.

The software cut-off may be considered as the phase necessary to prepare the device for a hardware cut-off to prevent deep discharge and damage to the battery.

Below a second threshold usually the connection to the battery is completely interrupted to prevent deep discharge by the last active component of the MEMD, the battery manager or battery control circuit.

The present invention provides implementations to enable the use of an NFC component of the device even in battery voltage conditions below software (SW) cut-off (or switched off conditions) of the MEMD (FIGS. 2 to 4). Especially the implementations of FIGS. 2 to 4 may also be considered as a device applying individual cut-off thresholds (SW cut-off for the first functionality and hardware- (HW-) or battery cut-off) for the NFC-functionality.

Figure 6:
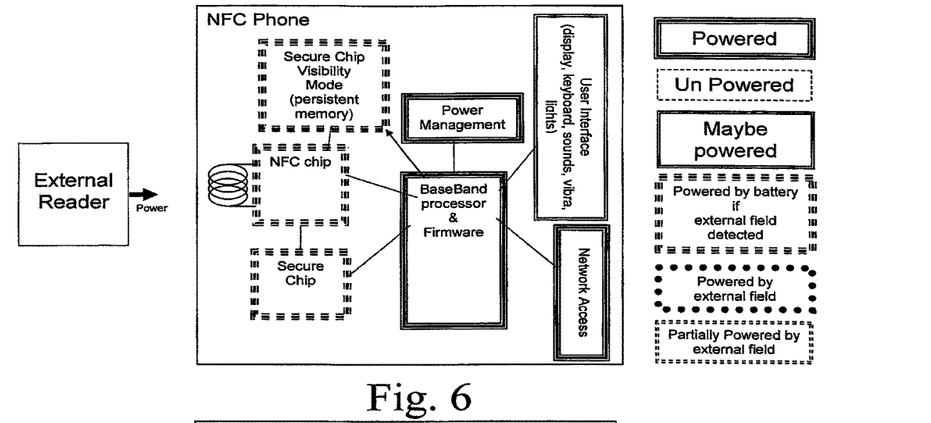
FIG. 6 is another example illustration of a mobile electronic multifunctional device according to an embodiment the present invention in a normal operation condition in an NFC-Reader/Writer mode.
Figure 7:
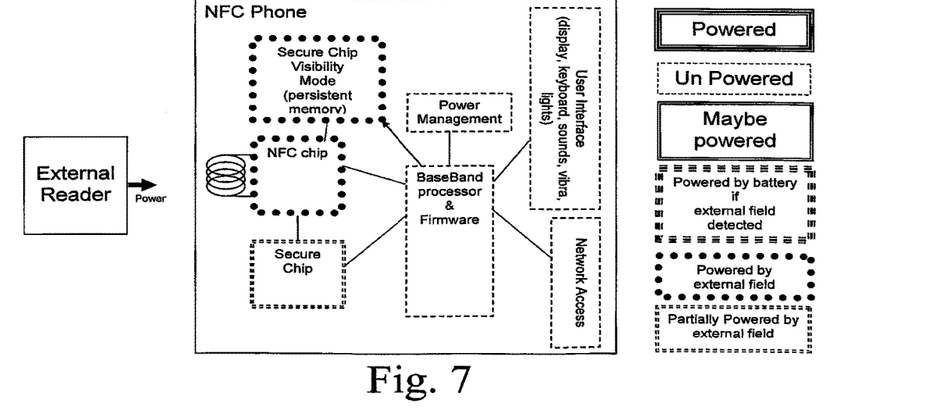
FIG. 7 depicts the mobile electronic multifunctional device of FIG. 6 in a phone off, software cut-off hardware cut-off or battery cut-off condition according to one embodiment of the present invention.

The present invention provides implementations to enable the use of an NFC component of the device under all battery voltage conditions (below SW cut-off or switched off conditions) of the MEMD (FIGS. 6 and 7).

FIG. 6 is another example of a mobile electronic multifunctional device according to an embodiment of the present invention in a normal operation condition in an NFC-Reader/Writer mode. As the device depicted in FIGS. 2 to 4, the device of this implementation is provided with a power management, a base-band and firmware processor, a user interface and network interface (making the MEMD a NFC enabled cellular phone). As in FIGS. 2 to 4, device is provided with a NFC chip or NFC component providing at least NFC transponder capabilities to the MEMD.

In addition to the implementation of FIGS. 2 to 4 the device is provided with a dedicated memory for storing the different configuration for the NFC component for the different operation conditions of said MEMD embodied as a NFC enabled cellular telephone.

As the NFC component is operated as a NFC transponder only replying to an external field, the MEMD has to be provided with RF power from an external reader to wake up the NFC components. Therefore all NFC-related components are depicted as only being powered if an external RF field is detected.

As in case of FIGS. 2 and 3 the power management (battery control circuit), the base-band and firmware processor and the network interface are powered by the (not depicted) battery. For reasons of the key-lock and power saving applications the user interface may be powered or not.

FIG. 7 depicts the mobile electronic multifunctional device of FIG. 6 in a phone off, hardware cut-off or battery cut-off condition. In contrast to FIG. 6, the device is in a phone off, hardware cut-off or battery cut-off condition that is indicated by the fact that all components like power management, the base-band and firmware processor, the network interface and the user interface are not powered. The depicted situation may occur if and when the battery has been removed from the device.

However, the NFC-components may be powered by an RF field from an external NFC reader (or from any other RF source). The fact that the NFC components of the device my be powered by an external RF field entails a severe design restriction: as the NFC components of the device may be completely RF energy operated, the power consumption has to be restricted severely as the maximum energy that may be generated from the received RF field of an external RF reader is restricted. To avoid unnecessary waste of power some components of the MEMD are designed as partially powerable components (such as the secure chip).

The depicted embodiment allows to selectively powering parts of a system by external field energy alone in order to provide "battery off" functionality for end user. In order to support also user controllability in which parts of the emulation is visible or if the emulation available at all, some common logic or memory is available for both, battery powered (~phone on) and no-battery (~phone off) situations.

Selectively power parts of a system by an external RF field is a prerequisite to provide "power off" functionality for end user, as the energy content of an RF reader signal is sufficient to power the whole device. This depicted implementation of the MEMD provides by the visibility mode chip the same amount of user—controllability of the NFC visibility for both cases (Phone on and Phone off).

The user may control the card emulation visibility by entering respective data into the visibility mode chip. Thereby she may control to disable and enable card emulation all together, or single components of the NFC transponder/card functionality. She also may have more fine grained control over card emulation like: disable a Mifare Classic emulation function (e.g. payment card) of the NFC component and enable ISO 14443-4 level emulation function (e.g. a bus ticket) of the NFC component fore each operation condition separately. This invention enables having the same (or different) settings in place also when the phone is without a (battery) off by providing a shared memory or firmware to drive the operation in both cases. The system draws all of the card emulation power from the external reader field. The user may select the configurations of the phone, prescribing how the card emulation should behave in each of the operation conditions. For an illustrative example about the configurable options, see the FIGS. 8 and 9.

With the implementation depicted in FIG. 7, the entire phone may be in not powered state. Even the battery may be removed from the phone and the NFC-Card emulation functionality will still work. In this case, the key added part is a small and economical shared memory for storing the card emulation mode information. This shared part can be just a memory and the NFC chip takes care of interpreting the mode information in the memory. The shared part can also be a small processor that is able to drive the card emulation in addition to storing the mode information persistently.

In accordance with an embodiment of the present invention, the energy budget may be extremely tight. The available power from external field may be around 12 mW. This energy level may indicate that only parts of secure chip or the visibility mode chip may be powered. The card emulation HW/SW should be designed so that it also has a minimum power consumption mode. This mode can be implemented for instance by having a secondary power supply line with low voltage and powering only the very parts that are designed to serve card emulation. For instance none of the high speed interface or network authentication features are necessary in this mode and all those parts should remain in a not powered state all the way down to the silicon level in order to match the energy budget.

It is envisaged to also use the battery power of the MEMD if and when the MEMD is anywhere above HW cut-off voltage and switched off, basically only the user interface and any network side and RF components are switched off. The processor is then able to wake up and execute phone software, when woken up by an "external field present" interrupt from NFC front end (as indicated in the MEMD implementation of FIG. 4). At this time the processor may also execute the card emulation related code and make decision of whether the card emulation is visible to a reader (not the user) or not. It is also able to execute any other card emulation related code like SW implemented card emulation. It should not, however wake up the user interface or the cellular networking parts of the phone.

This approach provides in many cases the means needed to fulfill for instance public transportation requirements about users being able to exit a closed gate metro system even when the phone has run out of battery.

It is to be noted that it is envisaged to implement combined MEMDs with the combined capabilities of the devices of FIGS. 2 to 4 and 6 and 7, to provide NFC emulation (and reader/writer) capabilities below the software cutoff conditions and to provide NFC transponder capabilities under all conditions (including batter cut-off).

Figure 8:
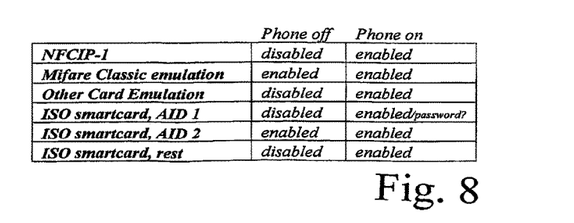
FIGS. 8 and 9 depict different example implementations of user interfaces that enable a user to select different NFC-communication component configurations for different operation conditions of the mobile electronic multifunctional device according to one embodiment of the present invention.
Figure 9:
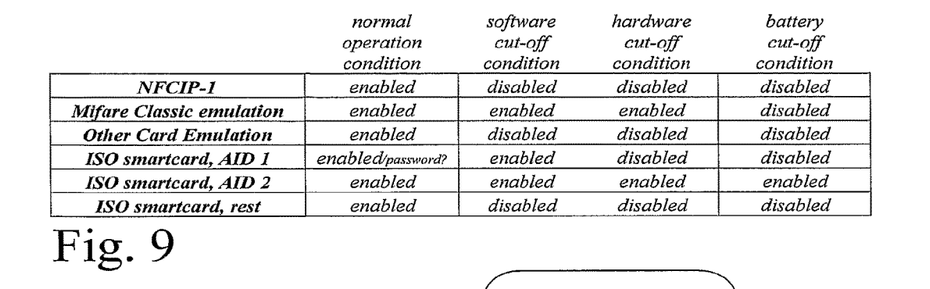

FIGS. 8 and 9 depict different implementations of user interfaces/control menus that enabling a user to select different NFC-communication component configurations for different operation conditions of the mobile electronic multifunctional device according to embodiments of the present invention. With this dedicated control menu/user interface for terminals as user to control "visibility" of the applications residing in the secure smart card module (as an example of a NFC-communication component) for power-on (normal operation condition) and power off-situations (such as software, hardware or battery cut-off conditions).

In FIG. 8 the user can select if the NFC-communication components of the mobile electronic device should be available in power-on and/or in the power off states (or operation/cut-off conditions). It is envisaged to implement this menu as an extension to a convention menu in which the user may select the "visibility" of the applications residing in the secure smart card module for normal operation condition (i.e. "device on").

FIG. 9 depicts a more sophisticated implementation of the menu of FIG. 8, wherein a user may select different setting of NFC-configurations for each of the different operation (or cut-off) conditions.

This menu (of FIGS. 8 and 9) is linked to a control logic that is responsible for providing necessary control over applications residing in a secure smart card module that can be attachable or alternatively an integrated module for enabling card emulation operation also in situations where the mobile terminal is not powered due to low charge in the battery, or simply because the terminal is shut down (turned off).

It should be noted that according to the embodiments of the present invention, there may be certain automatic/initial settings provided by the terminal that can be set for the power off situations, and users have the option of adjusting the settings based on their personal preferences e.g. by one of the user interfaces depicted in FIG. 8 or 9.

Further, in the mobile electronic multifunctional device an arrangement is to be provided for allowing the RFID front-end and the secure smart card module to utilize the (residual) power left in the battery in the cut-off conditions (or power off-situations) when the RFID front-end detects an external field or a NFC-communication event. Therefore, there needs to be some sort of controlling logic that takes care of the powering of suitable parts of the device when receiving a trigger signal from the RFID front-end indicating that a suitable RF field (13.56 MHz) is detected. This controlling unit may be implemented in the battery control circuit This controlling circuit, then connects suitable parts of the RFID front-end and the secure smart card module for providing enough power to perform the card emulation process using the control information provided by the dedicated control menu/UI when the device was powered.

Figure 10:
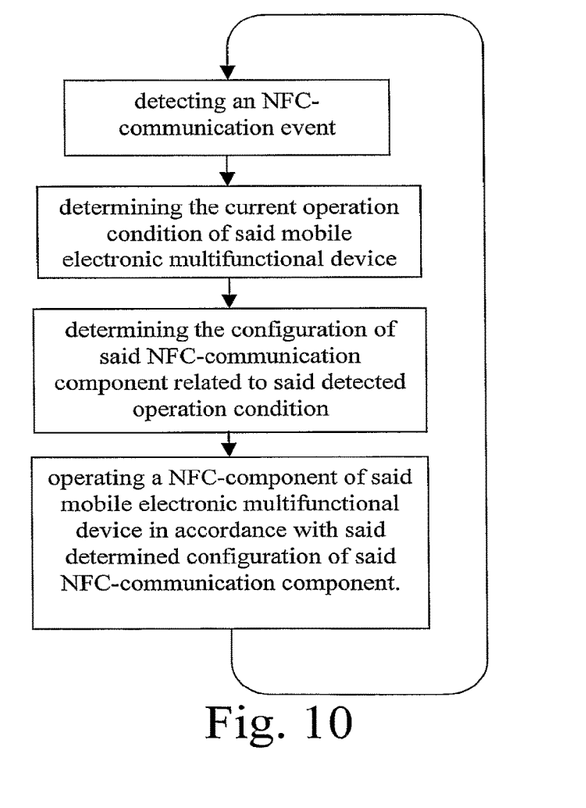
FIG. 10 depicts a flowchart of a method according to one aspect of the present invention.

FIG. 10 depicts a flowchart of a method according to one aspect of the present invention. The Flowchart starts with detecting an NFC-communication event, e.g. by detecting an RF field at an antenna of NFC-communication device. Then the current operation condition of said mobile electronic multifunctional device is determined, e.g. by detecting if the device is in a normal operation condition (i.e. "switched on"), or in a software, hardware or battery cut-off condition (wherein one of which may also be considered as device "switched off"). Then a configuration of said NFC-communication component related/or allocated to said detected operation condition is determined, and said NFC-communication component of said mobile electronic multifunctional device is operated in accordance with said determined configuration of said NFC-communication component.

Especially the part of operating the NFC-communication component in accordance with said determined configuration may additionally comprise selectively powering parts of a system by external field energy alone in order to provide "battery cut-off" functionality for end user. In order to support also user controllability in which parts of the emulation is visible (or if the emulation available at all) some common logic or memory is available for both, battery powered (e.g. phone on) and no-battery (e.g. phone off) conditions of the mobile electronic multifunctional device. That is the method of the present invention may also be used to completely switch the NFC-communicability off or allow only phone off NFC operability. With the present invention it is possible to selectively power parts of a system in order to provide "power off" NFC-functionality of the mobile electronic multifunctional device for end user.

With the present invention it is possible to provide an interface to a user of mobile electronic multifunctional devices to avoid non logical or surprising behavior of the device and to provide user-controllability of the NFC-component for both cases: Phone-on and No-Battery (even though the interface to select the NFC configurations may only be accessible in the device on or Phone-on operation condition).

The user has control to N-communication component (e.g. card emulation visibility). She should have control to disable and enable card emulation all together or separately for each operation condition of said mobile electronic multifunctional device. She also may have more fine grained control over card emulation like: Disable Mifare Classic emulation and enable ISO 14443-4 level emulation. Or even (more meaningful for the end user): Enable bus ticket but disable Visa card NFC-communication. This invention can also enable a user to have the same settings in place also when the phone is without a (battery) off by providing a shared memory or firmware to drive the operation in both cases.

This application contains the description of implementations and embodiments of the present invention with the help of examples. It will be appreciated by a person skilled in the art that the present invention is not restricted to details of the embodiments presented above, and that the invention can also be implemented in another form without deviating from the characteristics of the invention. The embodiments presented above should be considered illustrative, but not restricting. Thus the possibilities of implementing and using the invention are only restricted by the enclosed claims. Consequently various options of implementing the invention as determined by the claims, including equivalent implementations, also belong to the scope of the invention.

The invention claimed is:

1. An apparatus comprising:
   an interface to a near field communication component configured to provide near field communication functionality;
   a battery interface; and
   a battery control circuit, connected to said battery interface,
   wherein said battery control circuit is configured to control operation of said apparatus in accordance with a battery charging condition of a battery connected to the battery interface and to allow operation of the near field communication component when the battery charging condition is any of at least two of:
   a normal operation condition;
   a software cut-off condition; and
   a hardware cut-off condition,
   wherein said apparatus further comprises a storage configured to store configurations of the near field communication component connected via said interface to said near field communication component to allow operation of said near field communication component when said battery charging condition is at least one of the software cut-off condition and the hardware cut-off condition, and wherein at least one software application is unavailable to a user when said battery charging condition is the software cut-off condition and said apparatus has at least substantially reduced hardware functionality available to a user when said battery charging condition is the hardware cut-off condition.

2. An apparatus according to claim 1, further comprising:
an additional interface to a component configured to provide a first functionality.

3. An apparatus according to claim 2, further comprising:
a component configured to provide said first functionality, connected to said additional interface;
a battery, connected to said battery interface; and/or
a near field communication component, connected to said interface to said near field communication component.

4. An apparatus according to claim 2, wherein said first functionality comprises cellular telephone functionality.

5. An apparatus according to claim 1, wherein said near field communication component is configured with a dedicated memory configured to store information on how to operate said near field communication component under said normal operation, software cut-off, and/or hardware cut-off conditions upon detecting a near field communication wakeup event.

6. An apparatus according to claim 5, wherein said dedicated memory is partially powered.

7. An apparatus according to claim 1, wherein said apparatus further comprises a user interface, and wherein said storage is configured to be configurable by a user input via said user interface.

8. An apparatus according to claim 1, further comprising:
an additional interface to a component configured to provide a first functionality;
wherein said first functionality is not available on any of the software cut-off condition and/or the hardware cut-off condition, while the near field communication component is still available on one or more of the cut-off conditions.

9. An apparatus, comprising:
a battery interface; and
a battery control circuit, connected to said battery interface,
wherein said battery control circuit is configured to control operation of said apparatus in accordance with a charging condition of a battery connected to said battery interface to allow operation of a component of the apparatus when the battery charging condition is any of at least two of:
a normal operation condition;
a software cut-off condition; and
a hardware cut-off condition,
wherein said apparatus further comprises a user configurable storage to store configurations of said apparatus to allow operation of said component of said apparatus when said battery charging condition is at least one of the software cut-off condition and the hardware cut-off condition,
and wherein at least one software application is unavailable to a user when said battery charging condition is the software cut-off condition and said apparatus has at least substantially reduced hardware functionality available to a user when said battery charging condition is the hardware cut-off condition.

10. An apparatus of claim 9, further comprising:
an interface to at least one functionality.

11. An apparatus according to claim 10, further comprising:
a component configured to provide said at least one functionality, connected to said interface to said at least one functionality; and
a battery, connected to said battery interface.

12. An apparatus according to claim 10, wherein said at least one functionality comprises at least one functionality selected from the group of cellular telephone functionality, a near field communication functionality and a data reproduction functionality.

13. An apparatus according to claim 9, further comprising:
a user interface, and wherein said battery control circuit is configured to be configurable by a user input via said user interface.

14. An apparatus according to claim 9, further comprising:
an additional interface to a component configured to provide a first functionality;
wherein said first functionality is not available on any of the software cut-off condition and/or the hardware cut-off condition, while the near field communication component is still available on one or more of the cut-off conditions.

15. A method, comprising:
detecting a near field communication event;
detecting a charging condition of a battery of a near field communication enabled apparatus;
determining a configuration of a near field communication component of said apparatus related to said detected charging condition of said battery;
allowing operation of the near field communication component of said apparatus based on the detected battery charging condition, wherein the detected battery charging condition is any of at least two of:
a normal operation condition;
a software cut-off condition; and
a hardware cut-off condition; and
storing configurations of the near-field communication component to allow operation of said near field communication component when said battery charging condition is at least one of the software cut-off condition and the hardware cut-off condition,
wherein at least one software application is unavailable to a user when said battery charging condition is the software cut-off condition and said apparatus has at least substantially reduced hardware functionality available to a user when said battery charging condition is the hardware cut-off condition.

16. A method according to claim 15, further comprising:
using received radio frequency energy of said near field communication event to power said near field communication component of said apparatus.

17. A method according to claim 15, further comprising:
using a part of received radio frequency energy of said near field communication event to read from a memory device in which information is stored related to the configuration of said near field communication component related to said detected charging condition of said battery.

18. A method according to claim 15, further comprising:
detecting a voltage of a battery of said apparatus;
determining a configuration of said near field communication component of said apparatus related to said detected battery charging condition; and
operating said near field communication component of said apparatus in accordance with said determined configuration of said near field communication component of said apparatus.

19. A method according to claim 15, further comprising:
receiving a user input defining a configuration of said apparatus for at least two of a normal operation, a software cut-off, and a hardware cut-off condition; and
storing said configuration of said apparatus in a storage of said apparatus.

20. A method according to claim 15, further comprising:
receiving a user input defining a configuration of said near field communication component for at least two of a normal operation, a software cut-off, and a hardware cut-off condition; and
storing said configuration of said near field communication component in a storage of said apparatus.

21. A method, comprising:
receiving a user input defining configurations of a mobile electronic device to allow operation of a component of said mobile electronic device when a battery charging condition is at least one of a software cut-off condition and a hardware cut-off condition;
storing said configurations of said mobile electronic device in a storage of said mobile electronic device; and
allowing operation of the component of the mobile electronic device when the battery charging condition is any of at least two of a normal operation condition, the software cut-off condition and the hardware cut-off condition,
wherein at least one software application is unavailable to a user when said battery charging condition is the software cut-off condition and said apparatus has at least substantially reduced hardware functionality available to a user when said battery charging condition is the hardware cut-off condition.

22. A method according to claim 21, further comprising:
detecting a charging condition of a battery;
determining a configuration of said mobile electronic device related to said detected charging condition of said battery; and
operating said mobile electronic device in accordance with said determined configuration of said mobile electronic device.

23. An article of manufacture, comprising:
a computer readable non-transitory medium containing computer processor readable code, which when executed by a processor causes an apparatus to perform:
detecting a near field communication event;
detecting a charging condition of a battery of a near field communication enabled apparatus;
determining a configuration of a near field communication component of said apparatus based on said detected charging condition of said battery; and
allowing operation of the near field communication component of said apparatus based on the detected battery charging condition, wherein the detected battery charging condition is any of at least two of:
a normal operation condition;
a software cut-off condition; and
a hardware cut-off condition; and
storing configurations of the near-field communication component to allow operation of said near field communication component when said battery charging condition is at least one of the software cut-off condition and the hardware cut-off condition,
wherein at least one software application is unavailable to a user when said battery charging condition is the software cut-off condition and said apparatus has at least substantially reduced hardware functionality available to a user when said battery charging condition is the hardware cut-off condition.

24. An article of manufacture, comprising:
a computer readable non-transitory medium containing computer processor readable code, which when executed by a processor causes an apparatus to perform:
receiving a user input defining configurations of a mobile electronic device to allow operation of a component of said mobile electronic device when a battery charging condition is at least one of a software cut-off condition and a hardware cut-off condition;
storing said configurations of said mobile electronic device in a storage of said mobile electronic device; and
allowing operation of the component of the mobile electronic device when the battery charging condition is any of at least two of a normal operation condition, the software cut-off condition and the hardware cut-off condition, wherein at least one software application is unavailable to a user when said battery charging condition is the software cut-off condition and said apparatus has at least substantially reduced hardware functionality available to a user when said battery charging condition is the hardware cut-off condition.

* * * * *